US007378653B2

(12) United States Patent
Wells

(10) Patent No.: US 7,378,653 B2
(45) Date of Patent: May 27, 2008

(54) INCREASING ION KINETIC ENERGY ALONG AXIS OF LINEAR ION PROCESSING DEVICES

(75) Inventor: Gregory J. Wells, Fairfield, CA (US)

(73) Assignee: Varian, Inc., Palo Alto, CA (US)

( * ) Notice: Subject to any disclaimer, the term of this patent is extended or adjusted under 35 U.S.C. 154(b) by 222 days.

(21) Appl. No.: 11/328,558

(22) Filed: Jan. 10, 2006

(65) Prior Publication Data

US 2007/0158550 A1 Jul. 12, 2007

(51) Int. Cl.
*B01D 59/44* (2006.01)

(52) U.S. Cl. ...................... 250/292; 250/281; 250/282; 250/285; 250/288

(58) Field of Classification Search ................ 250/292, 250/281, 282, 297
See application file for complete search history.

(56) References Cited

U.S. PATENT DOCUMENTS

| | | | | |
|---|---|---|---|---|
| 4,749,860 | A * | 6/1988 | Kelley et al. | 250/282 |
| 4,761,545 | A | 8/1988 | Marshall et al. | |
| 5,134,286 | A | 7/1992 | Kelley | |
| 5,179,278 | A | 1/1993 | Douglas | |
| 5,198,665 | A | 3/1993 | Wells | |
| 5,300,772 | A | 4/1994 | Buttrill, Jr. | |
| 5,324,939 | A | 6/1994 | Louris et al. | |
| 5,345,078 | A | 9/1994 | Kelley | |
| 5,420,425 | A * | 5/1995 | Bier et al. | 250/292 |
| 5,847,386 | A | 12/1998 | Thomson et al. | |
| 6,177,668 | B1 | 1/2001 | Hager | |
| 6,797,950 | B2 * | 9/2004 | Schwartz et al. | 250/292 |
| 6,800,846 | B2 * | 10/2004 | Bateman et al. | 250/281 |
| 6,815,673 | B2 * | 11/2004 | Plomley et al. | 250/292 |
| 7,034,294 | B2 * | 4/2006 | Schwartz et al. | 250/292 |
| 7,071,464 | B2 * | 7/2006 | Reinhold | 250/282 |
| 2003/0189171 | A1 * | 10/2003 | Londry et al. | 250/292 |
| 2004/0011956 | A1 * | 1/2004 | Londry et al. | 250/292 |
| 2004/0149903 | A1 * | 8/2004 | Wang | 250/292 |
| 2004/0245455 | A1 * | 12/2004 | Reinhold | 250/288 |
| 2005/0263696 | A1 | 12/2005 | Wells | |

OTHER PUBLICATIONS

Article by Schwartz, et al., entitled “A Two-Dimensional Quadrupole Ion Trap Mass Spectrometer”, published by J Am Soc Mass Spectrom 2002, 13, pp. 659-669.

* cited by examiner

*Primary Examiner*—Jack I. Berman
*Assistant Examiner*—Michael Maskell
(74) *Attorney, Agent, or Firm*—Bella Fishman; David P. Gloekler

(57) ABSTRACT

In a method for increasing the kinetic energy of an ion in a linear electrode structure, axial motion of the ion is constrained substantially to a selected axial end the electrode structure. The ion is driven to move axially from the selected end toward the other end and to reflect back toward the selected end. Constraining may be effected by adjusting one or more DC voltages applied to the ends and a central region of the electrode structure to create an axial potential well in the selected end. Driving may be affected by adjusting the DC voltage applied to the selected end to a magnitude greater than the value applied during the constraining step. The constraining and driving steps may be repeated a number of times. The method may be performed in connection with collision-induced dissociation.

22 Claims, 11 Drawing Sheets

INCREASING ION KINETIC ENERGY ALONG AXIS OF LINEAR ION PROCESSING DEVICES

FIELD OF THE INVENTION

The present invention relates generally to the manipulation or processing of ions in electrode structures of two-dimensional or linear geometry. More particularly, the invention relates to methods and apparatus for increasing the kinetic energy of ions, such as for performing collision-induced dissociation (CID). The methods and apparatus may be employed, for example, in conjunction with mass spectrometry-related operations including tandem and multi-stage mass spectrometry (MS/MS and $MS^n$).

BACKGROUND OF THE INVENTION

A linear or two-dimensional ion-processing device such as an ion trap is formed by a set of elongated electrodes coaxially arranged about a main or central axis of the device. Typically, each electrode is positioned in the plane (e.g., the x-y plane) orthogonal to the central axis (e.g., the z-axis) at a radial distance from the central axis. Each electrode is elongated in the sense that its dominant dimension (e.g., length) extends as a rod in parallel with the central axis. The resulting arrangement of electrodes defines an elongated interior space or chamber of the device between the inside surfaces of the electrodes that face inwardly toward the central axis. In operation, ions may be introduced, trapped, stored, isolated, and subjected to various reactions in the interior space, and may be ejected from the interior space for detection. Such manipulations require precise control over the motions of ions present in the interior space, as well as over the geometry, fabrication and assembly of the physical components of the electrode structure. The radial (or transverse) excursions of ions along the x-y plane may be controlled through application of appropriate RF signals to one or more of the electrodes to generate a two-dimensional (x-y), radial trapping field. The axial excursions of ions, or the motion of ions along the central axis, may be controlled through the application of appropriate DC signals to the electrodes to produce an axial (z) trapping field.

Additional RF signals may be applied between two opposing electrodes positioned on a radial (x or y) axis of the electrode set to produce an auxiliary or supplemental RF field that influences the motions of ions by increasing the amplitudes of their oscillations and thus increasing their kinetic energies along the radial axis as a result of resonant excitation. This type of resonant excitation along a radial direction is typically employed to eject ions from the electrode set to detect the ejected ions, or to eliminate the ejected ions so as to isolate other ions in the electrode set. The theory, mechanisms, and techniques of resonant excitation are well known to persons skilled in the art and thus need not be described in detail in the present disclosure. Briefly, excitation of an ion of a given mass-to-charge ratio occurs when the frequency of the supplemental RF field matches the secular frequency of the ion associated with motion along the axis of the dipole. If enough power is applied with the supplemental RF signal, the ion overcomes the restoring force imparted by the trapping field and is ejected from the linear ion trap in a direction along the radial axis. For this purpose, at least one of the electrodes to which the resonant dipole is applied typically includes a slot through which ejected ions can travel to an ion detector.

Resonant excitation along a radial or transverse direction may also be employed to promote collision-induced dissociation (CID). Processes involving CID are well-known in the field of tandem mass spectrometry and multi-stage mass spectrometry (MS/MS and $MS^n$). Briefly, to effect CID, a suitable inert gas is provided in the interior space of the electrode set and collisions occur between the precursor ion and components (atoms or molecules) of the surrounding gas. The increase in kinetic energy provided by the resonant dipole enables the precursor ion to dissociate into product ions in response to at least some of these collisions. The ions can then be mass-analyzed, and/or the product ions can be isolated and the process of CID repeated for successive generations of product ions.

It is known that if too much resonant voltage is applied to the two opposing electrodes during the CID process, the ions will gain too much energy in the transverse direction. As a potential result, the amplitudes of oscillation of the ions in the transverse direction will increase until the ions strike the electrodes or are ejected through a slot in the electrode and thus are lost. The need to avoid this event limits the maximum kinetic energy that the ions may have for CID. It is also known that the RF trapping potential in the transverse direction increases with the amplitude of the RF trapping voltage applied to the electrodes and decreases with ion mass. For a given transverse trapping potential, the maximum kinetic energy available for CID is determined. Although the amplitude of the RF trapping voltage could be increased to increase the RF trapping potential, increasing the RF trapping potential also limits the mass range of ions that can be trapped in the electrode set by increasing the mass cut-off limit, thus limiting the mass range of the product ions formed by CID. Accordingly, a method of increasing the kinetic energy available for CID is needed that does not compromise the mass range.

In addition to time sequence-based devices such as multipole ion traps, sequential analyzer-based devices such as triple-quadrupole mass spectrometers are also employed for CID. In a triple-quadrupole mass spectrometer, the first quadrupole electrode set is utilized as a mass filter to select precursor ions, the second quadrupole electrode set is utilized as a collision cell for CID, and the third quadrupole electrode set is utilized as a mass filter to select product ions produced in the collision cell. Mass-selected precursor ions emitted from the first mass filter are accelerated to a desired energy and enter the gas-filled collision cell. The ions make one pass from the entrance to the exit of the collision cell. As the ions travel through the collision cell, collisions between the high-energy ions and the gas cause CID. The resulting product ions formed in the collision cell have sufficient kinetic energy remaining that these ions travel to the exit of the collision cell and enter the second mass filter for mass analysis. Any of the original precursor ions that have not collided will also exit the collision cell without any further opportunity to be dissociated. This well-known disadvantage of sequential analyzer-based devices limits the efficiency of converting the precursor ions into product ions by CID.

In view of the foregoing, it would be advantageous to provide techniques for increasing the maximum amount of kinetic energy attainable by ions in a linear ion-processing device such as a linear ion trap. It would also be advantageous to provide techniques for CID that increase the maximum amount of kinetic energy available for CID without limiting mass range. It would also be advantageous to provide techniques that do not rely on excitation in a direction that is radial or transverse to the central axis of a linear device. It would also be advantageous to provide techniques that do not rely on excitation by a resonant RF field. It would also be advantageous to provide techniques for CID that enable multiple cycles of trapping, excitation and dissociating the ions to increase the efficiency of the conversion of precursor ions to product ions by repeating these cycles multiple times.

SUMMARY OF THE INVENTION

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a method is provided for increasing the kinetic energy of an ion in a direction along a central axis of a linear electrode structure. Such an electrode structure includes a first end region, a second end region spaced from the first end region along the central axis, and a central region axially interposed between the first and second end regions. The electrode structure defines an interior space in which the ion is disposed that extends along the central axis through the first end region, the central region and the second end region. According to the method, axial motion of the ion is constrained substantially to a selected one of the first and second end regions. The ion is driven to move axially from the selected end region toward the other end region and to reflect back toward the selected end region.

According to another implementation, the step of constraining includes applying a plurality of DC voltages respectively to the first end region, the central region, and the second end region at respective magnitudes to create an axial potential well at the selected end region. The step of driving includes adjusting the DC voltage applied to the selected end region.

According to another implementation, the steps of constraining and driving are repeated one or more times. For each iteration of constraining, the same end region may be selected for constraining as in the previous iteration or the other end region may be selected.

According to another implementation, a method is provided for dissociating a precursor ion in a linear ion trap. Such a linear ion trap includes a first end region, a second end region spaced from the first end region along an elongated axis of the linear trap, and a central region interposed between the first and second end regions. The linear ion trap also includes a plurality of electrodes in each of the regions that are arranged coaxially about the elongated axis, and defines an elongated volume of the linear ion trap. According to the method, a plurality of ions in the interior space are accumulated substantially at a selected one of the first and second end regions. The plurality of ions includes one or more precursor ions. The plurality of ions are driven to move axially from the selected end region toward the other end region and to reflect back toward the selected end region to cause a collision between at least one of the ions and a gas in the interior space.

According to another implementation, the steps of accumulating and driving are repeated one or more times on one or more successive generations of product ions to yield an nth generation product ion. For each accumulation, the end region selected for accumulation is either the first end region or the second end region.

According to another implementation, an apparatus is provided for increasing the kinetic energy of an ion along an axial direction. The apparatus comprises a linear electrode structure that includes a first end region, a second end region spaced from the first end region along a central axis, and a central region axially interposed between the first and second end regions. The linear electrode structure defines an interior space extending along the central axis through the first end region, the central region, and the second end region. The apparatus also comprises means for constraining axial motion of one or more ions in the interior space substantially to a selected one of the first and second end regions, and means for driving one or more ions to move axially from the selected end region toward the other end region and to reflect back toward the selected end region.

DETAILED DESCRIPTION OF THE INVENTION

In general, the term "communicate" (for examples a first component "communicates with" or "is in communication with" a second component) is used herein to indicate a structural, functional, mechanical, electrical, optical, magnetic, ionic or fluidic relationship between two or more components (or elements, features, or the like). As such, the fact that one component is said to communicate with a second component is not intended to exclude the possibility that additional components may be present between, and/or operatively associated or engaged with, the first and second components.

The subject matter provided in the present disclosure generally relates to manipulating, processing, or controlling ions in devices in which electrodes are arranged in a linear or two-dimensional geometry. The electrode arrangements may be utilized to implement a variety of functions. As non-limiting examples, the electrode arrangements may be utilized as chambers for ionizing neutral molecules; lenses or ion guides for focusing, gating and/or transporting ions; devices for cooling or thermalizing ions; devices for trapping, storing and/or ejecting ions; devices for isolating desired ions from undesired ions; mass analyzers or sorters; mass filters; stages for performing tandem or multiple mass spectrometry (MS/MS or $MS^n$); collision cells for fragmenting or dissociating precursor ions; stages for processing ions on either a continuous-beam, sequential-analyzer, pulsed or time-sequenced basis; ion cyclotron cells; and devices for separating ions of different polarities. As will become evident from the following detailed description, the present disclosure provides implementations that are particularly useful in ion traps and for performing CID in such devices. However, the various implementations described in the present disclosure are not limited to the above-noted types of procedures, apparatus, and systems. Examples of implementations for increasing the kinetic energy of ions and for dissociating ions are described in more detail below with reference to FIGS. 1-12.

Figure 1:
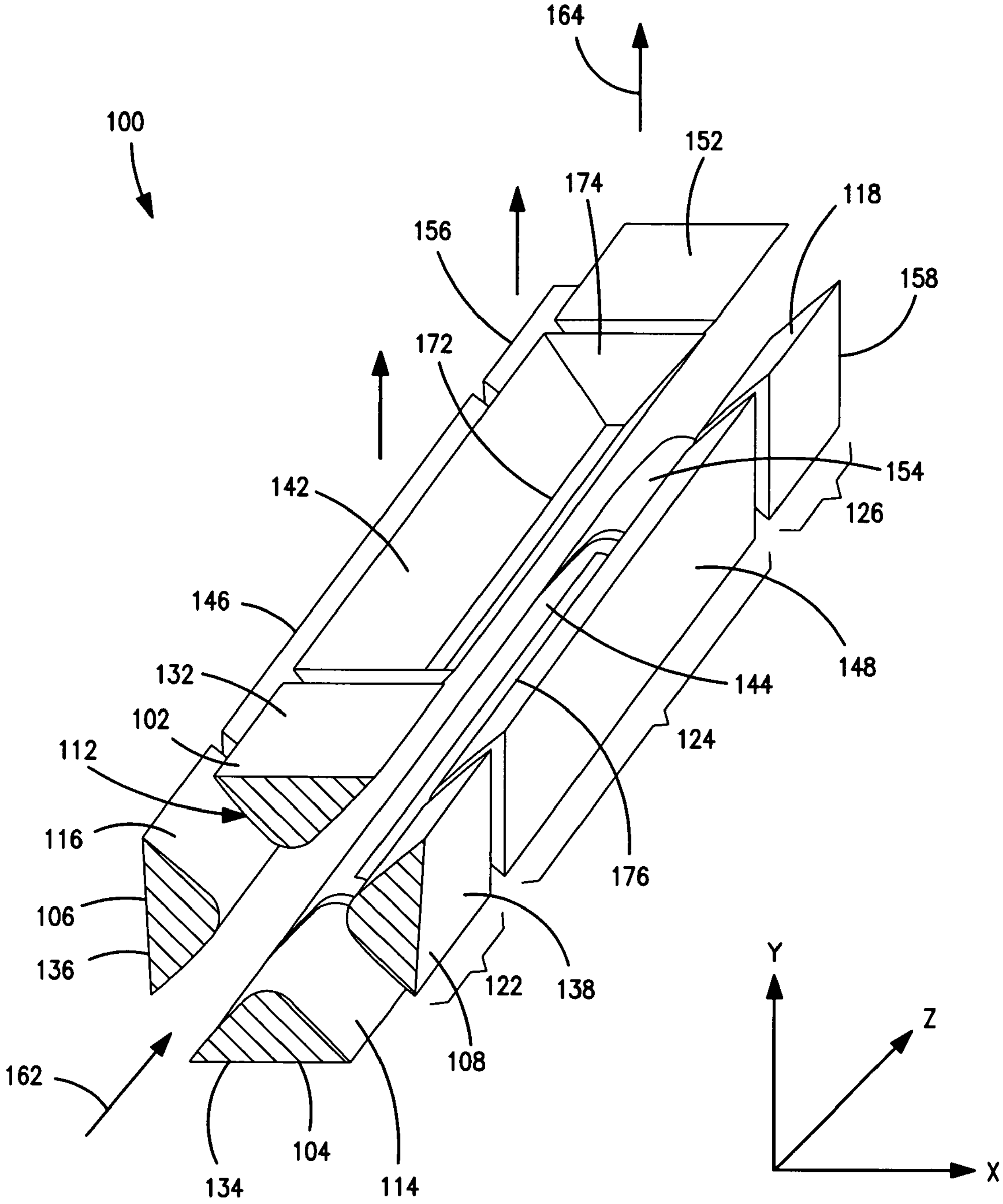
FIG. 1 is a perspective view of an example of an electrode structure provided according to implementations described in the present disclosure.
Figure 2:
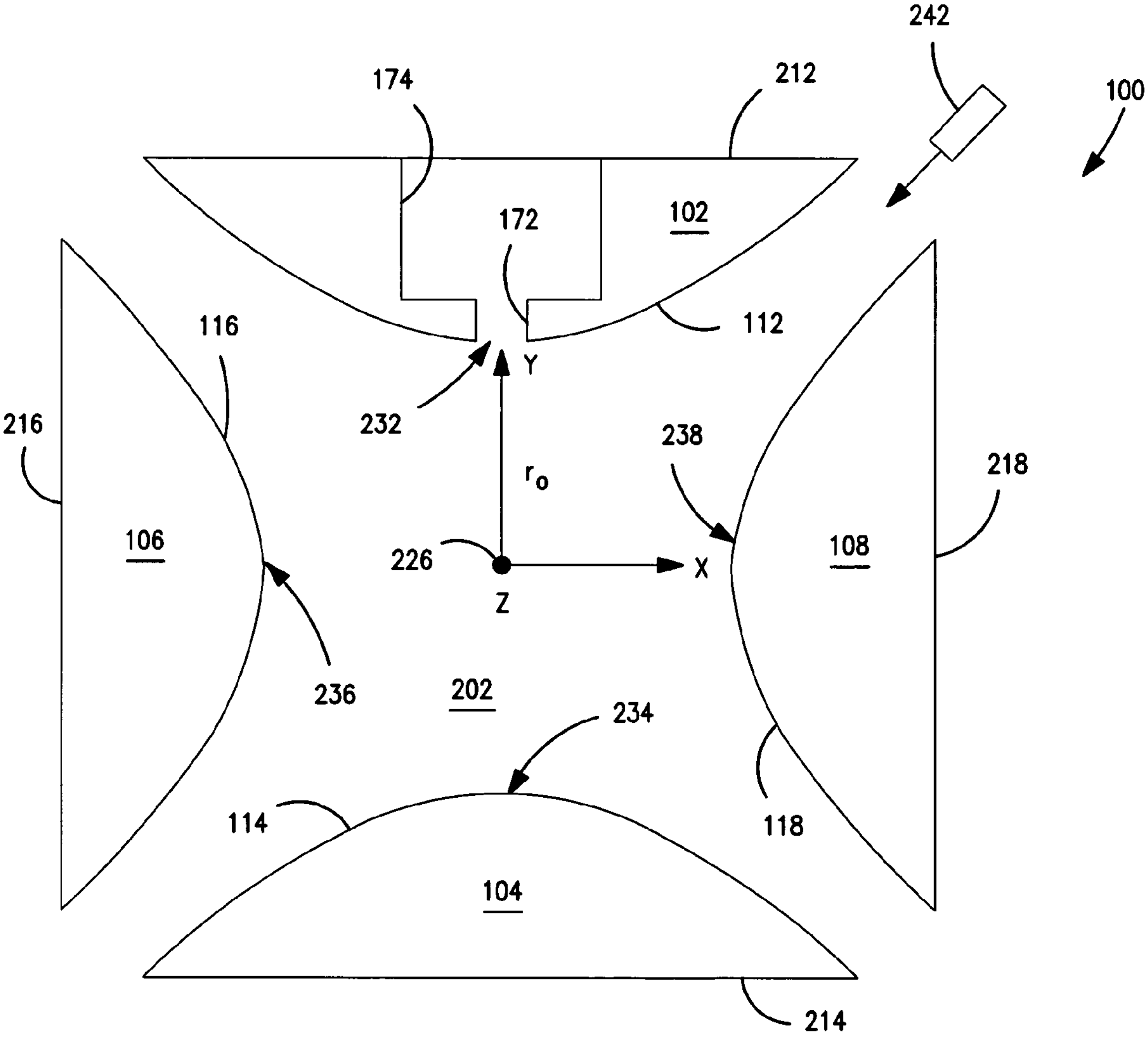
FIG. 2 is a cross-sectional view of the electrode structure illustrated in FIG. 1, taken in a radial or transverse plane orthogonal to the central axis of the electrode structure.
Figure 3:
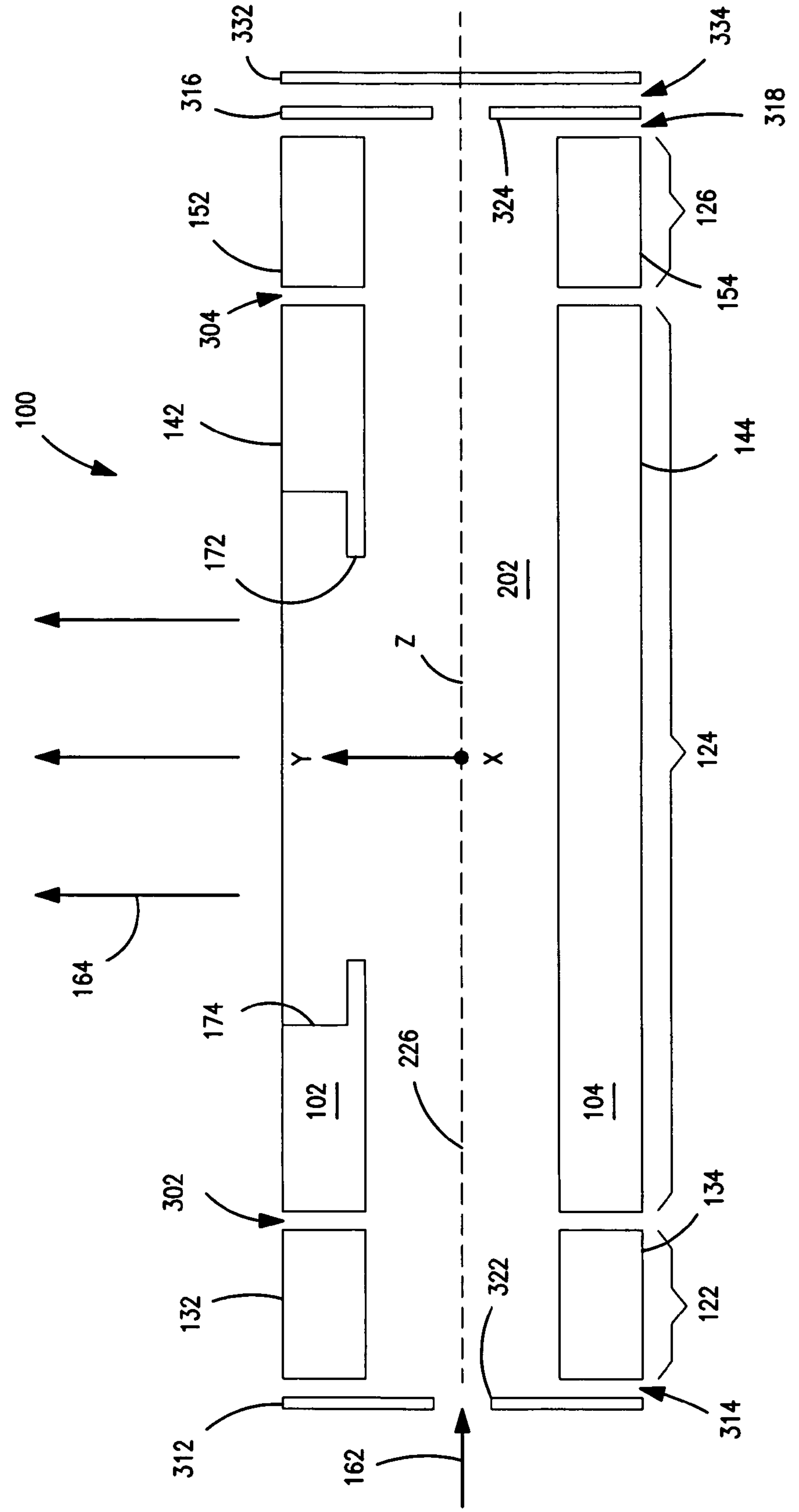
FIG. 3 is a cross-sectional view of the electrode structure illustrated in FIG. 1, taken in an axial plane orthogonal to the central axis.

FIGS. 1-3 illustrate an example of an electrode structure, arrangement, system, device, or rod set 100 of linear (two-dimensional) geometry that may be utilized to manipulate or process ions. FIGS. 1-3 also include a Cartesian (x, y, z) coordinate frame for reference purposes. For descriptive purposes, directions or orientations along the z-axis will be referred to as being axial, and directions or orientations along the orthogonal x-axis and y-axis will be referred to as being radial or traverse.

Referring to FIG. 1, the electrode structure 100 includes a plurality of electrodes 102, 104, 106 and 108 that are elongated along the z-axis. That is, each of the electrodes 102, 104, 106 and 108 has a dominant or elongated dimension (for example, length) that extends in directions generally parallel with the z-axis. In many implementations, the electrodes 102, 104, 106 and 108 are exactly parallel with the z-axis or as parallel as practicably possible. This parallelism can enable better predictability of and control over ion behavior during operations related to the manipulation and processing of ions in which RF fields are applied to the electrode structure 100, because in such a case the strength (amplitude) of an RF field encountered by an ion does not change with the axial position of the ion in the electrode structure 100. Moreover, with parallel electrodes 102, 104, 106 and 108, the magnitude of a DC potential applied end-to-end to the electrode structure 100 does not change with axial position. Instead, changes in DC potential relative to axial position may be deliberately controlled and facilitated through axial segmentation of the electrodes 102, 104, 106 and 108, as described below.

In the example illustrated in FIG. 1, the plurality of electrodes 102, 104, 106 and 108 includes four electrodes: a first electrode 102, a second electrode 104, a third electrode 106, and a fourth electrode 108. In the present example, the first electrode 102 and the second electrode 104 are generally arranged as an opposing pair along the y-axis, and the third electrode 106 and the fourth electrode 108 are generally arranged as an opposing pair along the x-axis. Accordingly, the first and second electrodes 102 and 104 may be referred to as y-electrodes, and the third and fourth electrodes 106 and 108 may be referred to as x-electrodes. This example is typical of quadrupolar electrode arrangements for linear ion traps as well as other quadrupolar ion processing devices. In other implementations, the number of electrodes 102, 104, 106 and 108 may be other than four. Each electrode 102, 104, 106 and 108 may be electrically interconnected with one or more of the other electrodes 102, 104, 106 and 108 as required for generating desired electrical fields within the electrode structure 100. As also shown in FIG. 1, the electrodes 102, 104, 106 and 108 include respective inside surfaces 112, 114, 116 and 118 generally facing toward the center of the electrode structure 100.

FIG. 2 illustrates a cross-section of the electrode structure 100 in the x-y plane. The electrode structure 100 has an interior space 202 generally defined between the electrodes 102, 104, 106 and 108. The interior space 202 is elongated along the z-axis as a result of the elongation of the electrodes 102, 104, 106 and 108 along the same axis. The inside surfaces 112, 114, 116 and 118 of the electrodes 102, 104, 106 and 108 generally face toward the interior space 202 and thus in practice are exposed to ions residing in the interior space 202. The electrodes 102, 104, 106 and 108 also include respective outside surfaces 212, 214, 216 and 218 generally facing away from the interior space 202. As also shown in FIG. 2, the electrodes 102, 104, 106 and 108 are coaxially positioned about a central longitudinal axis 226 of the electrode structure 100 or its interior space 202. In many implementations, the central axis coincides with the geometric center of the electrode structure 100. Each electrode 102, 104, 106 and 108 is positioned at some radial distance $r_0$ in the x-y plane from the central axis 226. In some implementations, the respective radial positions of the electrodes 102, 104, 106 and 108 relative to the central axis 226 are equal. In other implementations, the radial positions of one or more of the electrodes 102, 104, 106 and 108 may intentionally differ from the radial positions of the other electrodes 102, 104, 106 and 108 for such purposes as introducing certain types of electrical field effects or compensating for other, undesired field effects.

In the present example, the cross-sectional profile in the x-y plane of each electrode 102, 104, 106 and 108—or at least the shape of the inside surfaces 112, 114, 116 and 118—is generally hyperbolic to facilitate the utilization of quadrupolar ion trapping fields, as the hyperbolic profile more or less conforms to the contours of the equipotential lines that inform quadrupolar fields. The hyperbolic profile may fit a perfect hyperbola or may deviate somewhat from a perfect hyperbola. In either case, each inside surface 112, 114, 116 and 118 is curvilinear and has a single point of inflection and thus a respective apex 232, 234, 236 and 238 that extends as a line along the z-axis. Each apex 232, 234, 236 and 238 is typically the point on the corresponding inside surface 112, 114, 116 and 118 that is closest to the central axis 226 of the interior space 202. In the present example, taking the central axis 226 as the z-axis, the respective apices 232 and 234 of the first electrode 102 and the second electrode 104 generally coincide with the y-axis, and the respective apices 236 and 238 of the third electrode 106 and the fourth electrode 108 generally coincide with the x-axis. In such implementations, the radial distance $r_0$ is defined between the central axis 226 and the apex 232, 234, 236 and 238 of the corresponding electrode 102, 104, 106 and 108.

In other implementations, the cross-sectional profiles of the electrodes 102, 104, 106 and 108 may be some non-ideal hyperbolic shape such as a circle, in which case the electrodes 102, 104, 106 and 108 may be characterized as being cylindrical rods. In still other implementations, the cross-sectional profiles of the electrodes 102, 104, 106 and 108 may be more rectilinear, in which case the electrodes 102, 104, 106 and 108 may be characterized as being curved plates. The term "generally hyperbolic" is intended to encompass all such implementations. In all such implementations, each electrode 102, 104, 106 and 108 may be characterized as having a respective apex 232, 234, 236 and 238 that faces the interior space 202 of the electrode structure 100.

In the example illustrated in FIG. 1, the electrode structure 100 is axially divided into a plurality of sections or regions 122, 124 and 126 relative to the z-axis. In the present example, there are at least three regions: a first end region 122, a central region 124, and a second end region 126. Stated differently, the electrodes 102, 104, 106 and 108 of the electrode structure 100 may be considered as being axially segmented into respective first end sections 132, 134, 136 and 138, central sections 142, 144, 146 and 148, and second end sections 152, 154, 156 and 158. Accordingly, the first end electrode sections 132, 134, 136 and 138 define the first end region 122, the central electrode sections 142, 144, 146 and 148 define the central region 124, and the second end electrode sections 152, 154, 156 and 158 define the second end region 126. The electrode structure 100 according to the present example may also be considered as including twelve axial electrodes 132, 134, 136, 138, 142, 144, 146, 148, 152, 154, 156, and 158. In other implementations, the electrode structure 100 may include more than three axial regions 122, 124 and 126.

FIG. 3 illustrates a cross-section of the electrode structure 100 in the y-z plane but showing only the y-electrodes 102 and 104. The elongated dimension of the electrode structure 100 along the central axis 226, the elongated interior space 202, and the axial segmentation of the electrode structure 100 are all clearly evident. Moreover, in the present example, it can be seen that the division of the electrode structure 100 into regions 122, 124 and 126 (or the segmentation of the electrodes 102, 104, 106 and 108 into respective sections) is a physical one. That is, respective gaps 302 and 304 (axial spacing) exist between adjacent regions or sections 122, 124 and 124, 126. As discussed below, the axial segmentation of the electrode structure 100 is advantageous for enabling the controlled application of discrete DC voltages to the individual regions 122, 124 and 126, among other reasons not immediately pertinent to the presently disclosed subject matter.

As also shown in FIG. 3, the electrode structure 100 (or the device of which the electrode structure 100 is a part) may include additional electrically conductive members positioned along the z-axis. For instance, the electrode structure 100 may include a first end plate 312 axially spaced from the first end region 122 by a gap 314, and a second end plate 316 axially spaced from the second end region 126 by a gap 318. One or both of the first and second end plates 312 and 316 may have an aperture 322 and/or 324 centered at the central axis 226. In the example illustrated in FIG. 3, the first end plate 312 and the aperture 322 may be operated as an ion-focusing lens and gate for guiding a beam of ions into the interior space 202 of the electrode structure 100 under the control of an appropriate DC voltage potential. Additionally, a third end plate 332 may be axially spaced from the second end plate 316 by a gap 334. The third end plate 332 may be part of an enclosure or may be a member separate from such enclosure.

In the operation of the electrode structure 100, a variety of voltage signals may be applied to one or more of the electrodes 102, 104, 106 and 108, and/or other conductive members such as the first end plate 312, the second end plate 316 and the third end plate 332, to generate a variety of axially- and/or radially-oriented electric fields in the interior space 202 for different purposes related to ion processing and manipulation. The electric fields may serve a variety of functions such as injecting ions into the interior space 202, trapping the ions in the interior space 202 and storing the ions for a period of time, ejecting the ions mass-selectively from the interior space 202 to produce mass spectral information, isolating selected ions in the interior space 202 by ejecting unwanted ions from the interior space 202, promoting the dissociation of ions in the interior space 202 as part of tandem mass spectrometry, and the like.

For example, one or more DC voltage signals of appropriate magnitudes may be applied respectively to one or more of the electrodes 102, 104, 106 and 108 and/or other conductive members 312, 316 and 332, to produce axial (z-axis) DC potentials for controlling the injection of ions into the interior space 202. In some implementations, ions are axially injected into the interior space 202 via the first end region 122 (and, if provided, via the first end plate 312 through its aperture 322) generally along the z-axis, as indicated by the arrow 162 in FIGS. 1 and 3. The electrode sections 132, 134, 136 and 138 of the first end region 122, and/or an axially preceding ion-focusing lens such as the first end plate 312 or a multi-pole ion guide, may be operated as a gate for this purpose. Generally, however, the electrode structure 100 is capable of receiving ions in the case of external ionization, or neutral molecules or atoms to be ionized in the case of internal or in-trap ionization, into the interior space 202 in any suitable manner and via any suitable entrance location. Alternatives include radial injection through a space between adjacent electrodes 102, 104, 106 and 108 or through an aperture formed in one of the electrodes 102, 104, 106 or 108. These alternatives, however, are often considered to be disadvantageous when previously produced ions are being injected (external ionization), due the ions encountering fringe fields, energy barriers, and other conditions that may impair injection or cause unwanted ejection or annihilation/neutralization of injected ions. Some advantages of axial injection are described in co-pending U.S. patent application Ser. No. 10/855,760, filed May 26, 2004, titled "Linear Ion Trap Apparatus and Method Utilizing an Asymmetrical Trapping Field," which is commonly assigned to the assignee of the present disclosure.

Once ions have been injected or produced in the interior space 202, the DC voltage signals applied to one or more of the regions 122, 124 and 126 and/or other conductive members 312, 316 and 332 may be appropriately adjusted to prevent the ions from escaping out from the axial ends of the electrode structure 100. In addition, the DC voltage signals may be adjusted to create an axially narrower DC potential well that constrains the axial (z-axis) motion of the injected ions to a desired region 122, 124 or 126 within the interior space 202. For example, the DC voltage levels at the end regions 122 and 126 may be set to be higher or lower than the DC voltage level at the central region 124 to create a centrally-located potential well, depending on the polarity of the ions being processed. In the present context, terms such as "higher" and "lower" are used in the sense of absolute value to encompass the processing of positively or negatively charged ions. As described further below, the DC potential well may also be offset from the axial center (which in FIG. 3 is the origin of the x-y-z frame) of the electrode structure 100, and may be located at the first end region 122 or the second end region 126.

In addition to DC potentials, RF voltage signals of appropriate amplitude and frequency may be applied to the electrodes 102, 104, 106 and 108 to generate a two-dimensional (x-y), main RF quadrupolar trapping field to constrain the motions of stable (trappable) ions of a range of mass-to-charge ratios (m/z ratios, or simply "masses") along the radial directions. For example, the main RF quadrupolar trapping field may be generated by applying an RF signal to the pair of opposing y-electrodes 102 and 104 and, simultaneously, applying an RF signal of the same amplitude and frequency as the first RF signal, but 180° out of phase with the first RF signal, to the pair of opposing x-electrodes 106 and 108. The combination of the DC axial barrier field and the main RF quadrupolar trapping field forms the basic linear ion trap in the electrode structure 100.

Because the components of force imparted by the RF quadrupolar trapping field are typically at a minimum at the central axis 226 of the interior space 202 of the electrode structure 100 (assuming the electrical quadrupole is symmetrical about the central axis 226), all ions having m/z ratios that are stable within the operating parameters of the quadrupole are constrained to movements within an ion-occupied volume or cloud in which the locations of the ions are distributed generally along the central axis 226. Hence, this ion-occupied volume is elongated along the central axis 226 but may be much smaller than the total volume of the interior space 202. Moreover, the ion-occupied volume may be axially centered with the central region 124 of the electrode structure 100 through application of the non-quadrupolar DC trapping field that includes the above-noted axial potential well, or may be axially positioned within the first end region 122 or the second end region 126 in accordance with implementations described below. In many implementations, the well-known process of ion cooling or thermalizing may further reduce the size of the ion-occupied volume. The ion cooling process entails introducing a suitable inert background gas (also termed a damping, cooling, or buffer gas) into the interior space 202. Collisions between the ions and the gas molecules or atoms cause the ions to give up kinetic energy, thus damping their excursions. Examples of suitable background gases include, but are not limited to, hydrogen, helium, nitrogen, xenon, and argon. As illustrated in FIG. 2, any suitable gas source 242, communicating with any suitable opening of the electrode structure 100 or enclosure of the electrode structure 100, may be provided for this purpose. Collisional cooling of ions may reduce the effects of field faults to some extent.

In addition to the DC and main RF trapping signals, additional RF voltage signals of appropriate amplitude and frequency (both typically less than the main RF trapping signal) may be applied to at least one pair of opposing electrodes 102/104 or 106/108 to generate a supplemental RF dipolar excitation field that resonantly excites trapped ions of selected m/z ratios. The supplemental RF field is applied while the main RF field is being applied, and the resulting superposition of fields may be characterized as a combined or composite RF field. As previously noted, the supplemental RF field has conventionally been employed to effect collision-induced dissociation (CID). By contrast, implementations described in the present disclosure effect CID through axial acceleration of ions in response to adjustments in DC voltages, and thus an RF excitation field is not needed for CID.

In addition, the strength of the excitation field component may be adjusted high enough to enable ions of selected masses to overcome the restoring force imparted by the RF trapping field and be ejected from the electrode structure 100 for elimination or detection. Thus, in some implementations, ions may be ejected from the interior space 202 along a direction orthogonal to the central axis 226, i.e., in a radial or transverse direction in the x-y plane. For example, as shown in FIGS. 1 and 3, ions may be ejected along the y-axis as indicated by the arrows 164. As appreciated by persons skilled in the art, this type of ion ejection may be performed on a mass-selective basis by, for example, maintaining the supplemental RF excitation field at a fixed frequency while ramping the amplitude of the main RF trapping field. It will be understood, however, that dipolar resonant excitation is but one example of a technique for increasing the amplitudes of ion motion and radially ejecting ions from a linear ion trap. Other techniques are known and applicable to the electrode structures described in the present disclosure, as well as techniques or variations of known techniques not yet developed.

To facilitate radial ejection, one or more apertures may be formed in one or more of the electrodes 102, 104, 106 or 108. In the specific example illustrated in FIGS. 1-3, an aperture 172 is formed in one of the y-electrodes 102 to facilitate ejection in a direction along the y-axis in response to a suitable supplemental RF dipolar field being produced between the y-electrodes 102 and 104. The aperture 172 may be elongated along the z-axis, in which case the aperture 172 may be characterized as a slot or slit, to account for the elongated ion-occupied volume produced in the elongated interior space 202 of the electrode structure 100. In practice, a suitable ion detector (not shown) may be placed in alignment with the aperture 172 to measure the flux of ejected ions. To maximize the number of ejected ions that pass completely through the aperture 172 without impinging on the peripheral walls defining the aperture 172 and thus reach the ion detector, the aperture 172 may be centered along the apex 232 (FIG. 2) of the electrode 102. A recess 174 may be formed in the electrode 102 that extends from the outside surface 212 (FIG. 2) to the aperture 172 and surrounds the aperture 172 to minimize the radial channel or depth of the aperture 172 through which the ejected ions must travel. To maintain a desired degree of symmetry in the electrical fields generated in the interior space 202, another aperture 176 (FIG. 1) may be formed in the electrode 104 opposite to the electrode 102 even if another corresponding ion detector is not provided. Likewise, apertures may be formed in all of the electrodes 102, 104, 106 and 108. In some implementations, ions may be preferentially ejected in a single direction through a single aperture by providing an appropriate superposition of voltage signals and other operating conditions, as described in the above-cited U.S. patent application Ser. No. 10/855,760.

Certain experiments, including CID processes, may require that ions (desired ions) of a selected m/z ratio or ratios be retained in the electrode structure 100 for further study or procedures, and that the remaining undesired ions having other m/z ratios be removed from the electrode structure 100. Any suitable technique may be implemented by which the desired ions are isolated from the undesired ions. In particular, radial ejection is also useful for performing ion isolation. For example, a supplemental RF signal may be applied to a pair of opposing electrodes of the electrode structure 100, such as the y-electrodes 102 and 104 that include the aperture 172, to generate a supplemental RF dipole field in the interior space 202 between these two opposing electrodes 102 and 104. The supplemental RF signal ejects undesired ions of selected m/z values from the trapping field by resonant excitation along the y-axis. Examples of techniques employed for ion isolation include, but are not limited to, those described in U.S. Pat. Nos. 5,198,665 and 5,300,772, commonly assigned to the assignee of the present disclosure, as well as U.S. Pat. Nos. 4,749,860; 4,761,545; 5,134,286; 5,179,278; 5,324,939; and 5,345,078.

In accordance with the present disclosure, one or more ions are provided in a linear electrode structure such as the electrode structure 100 illustrated by example in FIGS. 1-3 or in any other suitable linear arrangement of electrodes. The ions are trapped by constraining their motions in the radial x-y plane through application of an RF trapping field and along the axial (z) axis through application of a DC trapping field. One or more of the DC voltages applied to the axially positioned components of the electrode structure 100 are adjusted to accumulate the ions at a selected axial end of the electrode structure 100, for example the first end region 122 or the second end region 126. One or more of the DC voltages applied at the axial end where the ions are accumulated are then rapidly adjusted (increased or decreased, depending on the polarity of the ions) to accelerate the ions axially through the electrode structure 100 from the axial end at which they were accumulated to (or at least toward) the other axial end—that is, in a direction generally along (collinear or parallel with) the z-axis or central axis 226. In this manner, the kinetic energies of the ions are increased in the axial direction as the ions are driven to move axially in response to the rapid adjustment of the DC voltages at the selected axial end and the axial DC potential difference between the high-voltage selected axial end and a lower-voltage region nearer to the other axial end of the electrode structure 100. As the DC potentials at the axial ends are greater than the DC potential between the axial ends, the ions may be permitted to reflect back and forth axially between the axial ends a number of times. After the initial acceleration of the ions and increase in kinetic energy, the ions begin to lose kinetic energy. If a background gas is provided in the interior space 202 of the electrode structure 100, the kinetic energies may eventually be reduced to thermal energies. Accordingly, in some implementations the kinetic energies may, in effect, be pulsed by re-accumulating the ions at one of the axial ends and re-adjusting the DC voltages at that axial end to drive the ions into axial motion again. The process of accumulating and driving may be repeated a desired number of times.

This axial excitation of the ions may be useful for a variety of purposes including, but not limited to, facilitating or promoting the study of reactions, ion-molecule interactions, and gas-phase ion chemistry. In particular, the axial excitation of ions may be useful for effecting the dissociation or fragmentation of the ions into smaller ions, for example as part of a tandem MS (MS/MS or $MS^n$) analysis. If a suitable background gas is provided in the interior space 202 of the electrode structure 100, the kinetic energies of the ions may be increased sufficiently as a result of the axial excitation as to effect CID. If the electrode structure 100 is operated as an ion trap, the stages of MS, including the iterations of CID, may be performed on a time-sequenced basis, and isolation and/or mass-analysis steps may be performed in between the accumulating and driving steps.

Figure 4:
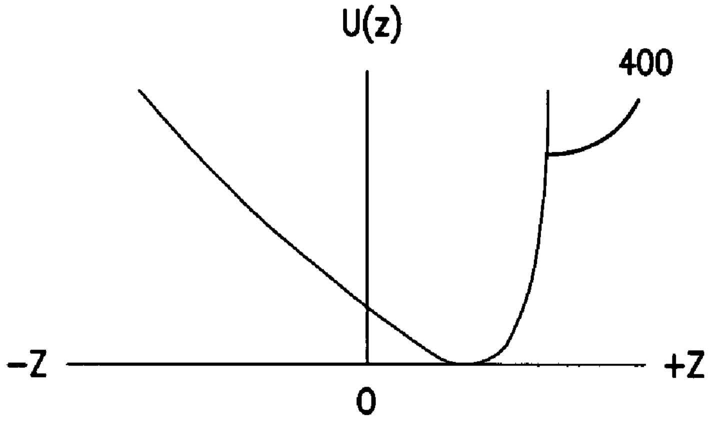
FIG. 4 is a plot of DC voltage magnitude as a function of axial position in a linear electrode structure, illustrating an axial DC potential well offset from the axial center of the electrode structure.

FIG. 4 illustrates an example of an axial distribution of DC voltage potential along the central axis of a linear electrode structure such as the electrode structure 100 (FIGS. 1-3) suitable for constraining the axial motion of ions to one axial end of the electrode structure 100 prior to axially driving the ions toward the other axial end. More specifically, FIG. 4 provides a curve 400 plotting DC voltage magnitude U(z) as a function of axial position z along the electrode structure 100. The abscissa represents axial distance to the left and to the right from the origin which, for example, may correspond to the axial center of the central region 124 of the electrode structure 100. The curve 400 includes a potential well. In this example, the axial end selected for ion accumulation is the second end region 126 of the electrode structure 100. Accordingly, the potential well shown in FIG. 4 has a minimum at a location on the abscissa that may generally correspond to an axial location within the second end region 126. The minimum of the potential well is shown to have a value at or near U(z)=0 by example only, as the minimum may have a non-zero value. It will also be understood that in practice the variance of DC magnitude with axial position may result in the curve 400 having a stepped profile.

Figure 5:
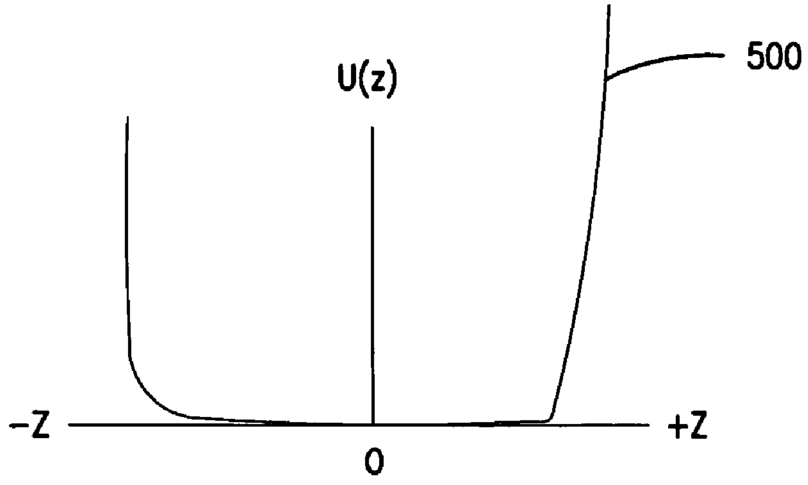
FIG. 5 is a plot of DC voltage magnitude as a function of axial position in a linear electrode structure, illustrating a reduced DC voltage over a substantial portion of the axial length of the electrode structure.

FIG. 5 illustrates an example of an axial distribution of DC voltage potential along the central axis 226 of the electrode structure 100 (FIGS. 1-3) suitable for driving the ions axially through the interior space 202 of the electrode structure 100 and thus effective to increase the kinetic energy of the ions as they travel in the axial direction. As indicated by the curve 500 in FIG. 5, the DC potential applied at the axial end of the electrode structure 100 where the ions are accumulated has been increased to eliminate the potential well depicted by the curve 400 in FIG. 4 and accelerate the ions toward the other axial end. In this example, the respective DC voltage levels on second end region 126 and the second end plate 316 have been rapidly increased to accelerate the ions toward the first end region 122. In addition, the DC potential is flattened along a majority of the axial length of the electrode structure 100, which may include most or all of the central region 124. It will be understood that the flattened portion of the curve 500 is shown to have a value at or near U(z)=0 by example only, as the flattened portion may have a non-zero value. At the point in time that the accumulated ions have in effect been released by the rapid adjustment in DC voltage level on second end region 126 and the second end plate 316, an axial potential difference is created over a substantial portion of the axial length of the electrode structure 100 and thus the potential energy of the ions is maximized. Consequently, the flattening of the curve 500 allows the ions to gain the maximum amount of energy exchange between their potential and kinetic energies and therefore gain the maximum amount of kinetic energy while being axially driven from one end to the other end. The maximizing of kinetic energy is advantageous when performing CID, as this method enables collisions with collision gas at very large kinetic-energy levels that have not been attained by CID techniques based on resonance RF excitation and particularly excitation in a radial or transverse direction. Moreover, there is a marked difference in potential between the flattened portion and the axial ends of the electrode structure 100. Thus, the curve 500 provides an axial DC barrier field that may be utilized to permit the accelerated ions to reflect back and forth between the axial ends of the electrode structure 100. The axial reflection may be useful for ensuring complete dissociation of a precursor ion along an intended dissociation or fragmentation pathway.

An example of a method for dissociating ions via axial excitation will now be described with reference to FIGS.

6-9, with the understanding that such axial excitation may be employed for purposes other than dissociation such as those previously noted.

Figure 6:
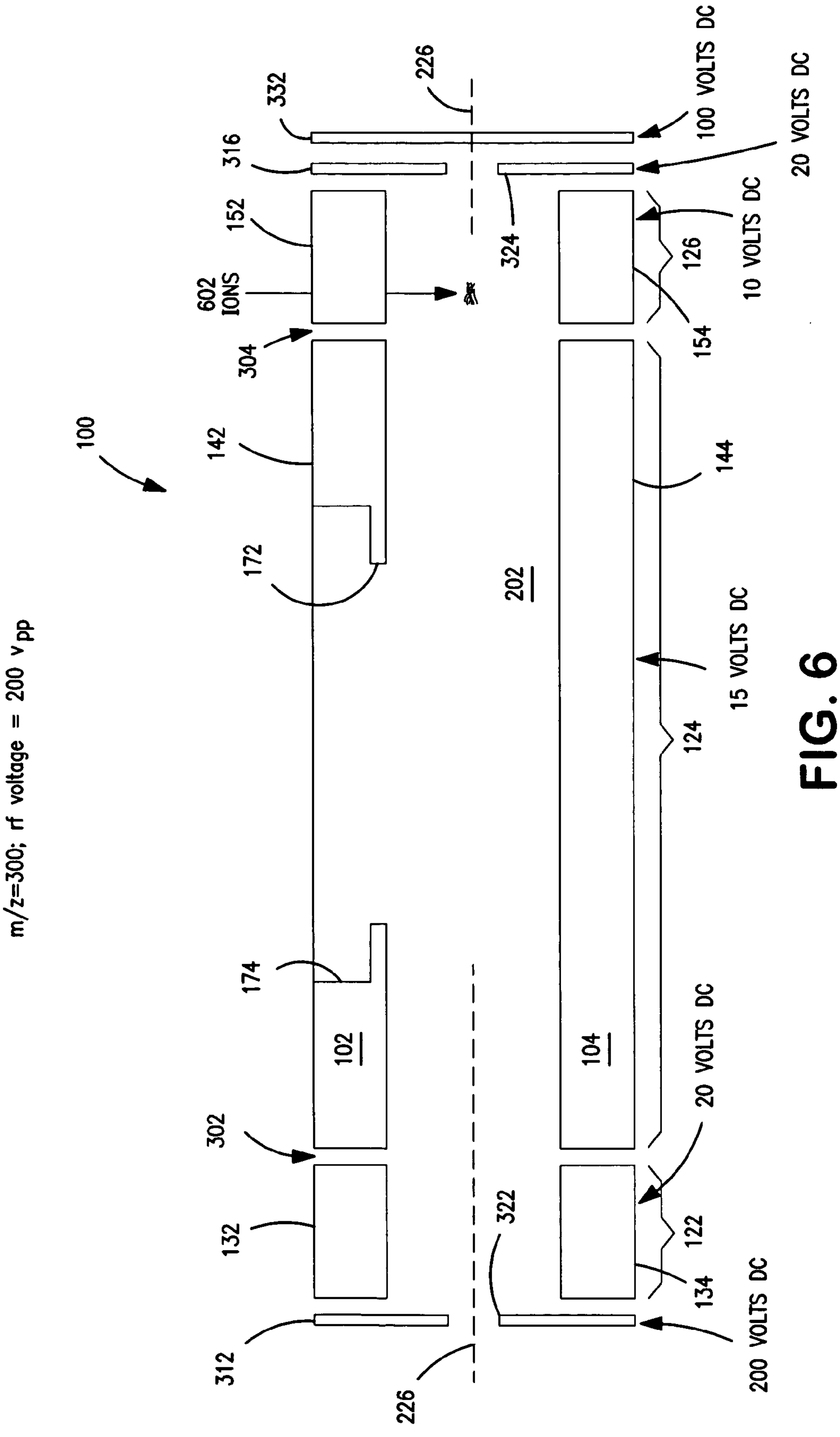
FIG. 6 is a cross-sectional view of an electrode structure similar to FIG. 3, illustrating an ion constrained to axial motion at one axial end of the electrode structure.

Referring to FIG. 6, ions are provided by any suitable means in the electrode structure 100 or other suitable electrode structure of linear geometry. As used in the present context, the term "provided" entails performing either internal or external ionization. In the case of internal ionization, sample molecules or atoms are admitted into the electrode structure 100 from any suitable sample source by any suitable means. In the case of external ionization, sample molecules or atoms are first ionized by any suitable ion source, and the ions are then admitted into the electrode structure 100 by any suitable means. As previously noted, in many implementations ions are admitted into the electrode structure 100 generally along the central axis 226. Once the ions have been provided, the ions are trapped through application of an RF voltage applied to the electrodes 102, 104, 106 and 108, and through application of DC voltages applied to the electrodes 102, 104, 106 and 108 as well as one or more other axially positioned conductive members 312, 316 and 332. A damping gas may be provided in the interior space 202 to allow the kinetic energies of the ions to be reduced to thermal energies. A precursor ion may be mass selected by any suitable means such as one of the isolation techniques noted above.

The DC voltages applied to the various axially positioned components of the electrode structure 100 are then adjusted so as to accumulate the precursor ions at one end of the electrode structure 100. In the present example, the ions are accumulated at the second end region 126 by adjusting the DC voltages so as to create an axial DC potential well at the second end region 126. It will be understood, however, that the DC potential well may be located at any other location within the electrode structure 100 where ion accumulation is desired. An axially off-center or asymmetric DC potential well sufficient for constraining the axial motions of ions to the second end region 126 may be realized, for example, by setting the respective DC voltage levels of the components of the electrode structure 100 as follows: 200 V on the first end plate 312; 20 V on the electrodes 132, 134, 136 and 138 of the first end region 122; 15 V on the electrodes 142, 144, 146 and 148 of the central region 124; 10 V on the electrodes 152, 154, 156 and 158 of the second end region 126; 20 V on the second end plate 316; and 100 V on the third end plate 332. More generally, the DC voltage or voltages at the end region 122 or 126 selected for accumulation is set at a lower value than the DC voltages applied to other axially positioned members of the electrode structure 100, while the DC voltages at the outermost axial ends are set high enough to prevent ions from escaping out from the axial ends.

FIG. 6 also illustrates the resulting accumulation of ions in the second end region 126 by including a simulated trajectory 602 of a single ion of m/z=300 after having been kinetically cooled through collisions with a damping gas and trapped at the low-potential end of the electrode structure 100. The trajectory was computed using the ion simulation program SIMION™ developed at the Idaho National Engineering and Environmental Laboratory, Idaho Falls, Id. In addition to the DC voltage levels given above, the RF trapping voltage is set to 200 $V_{pp}$ (peak-to-peak). It will be noted that small axial and transverse (radial) motions of the ion are still visible.

Figure 7:
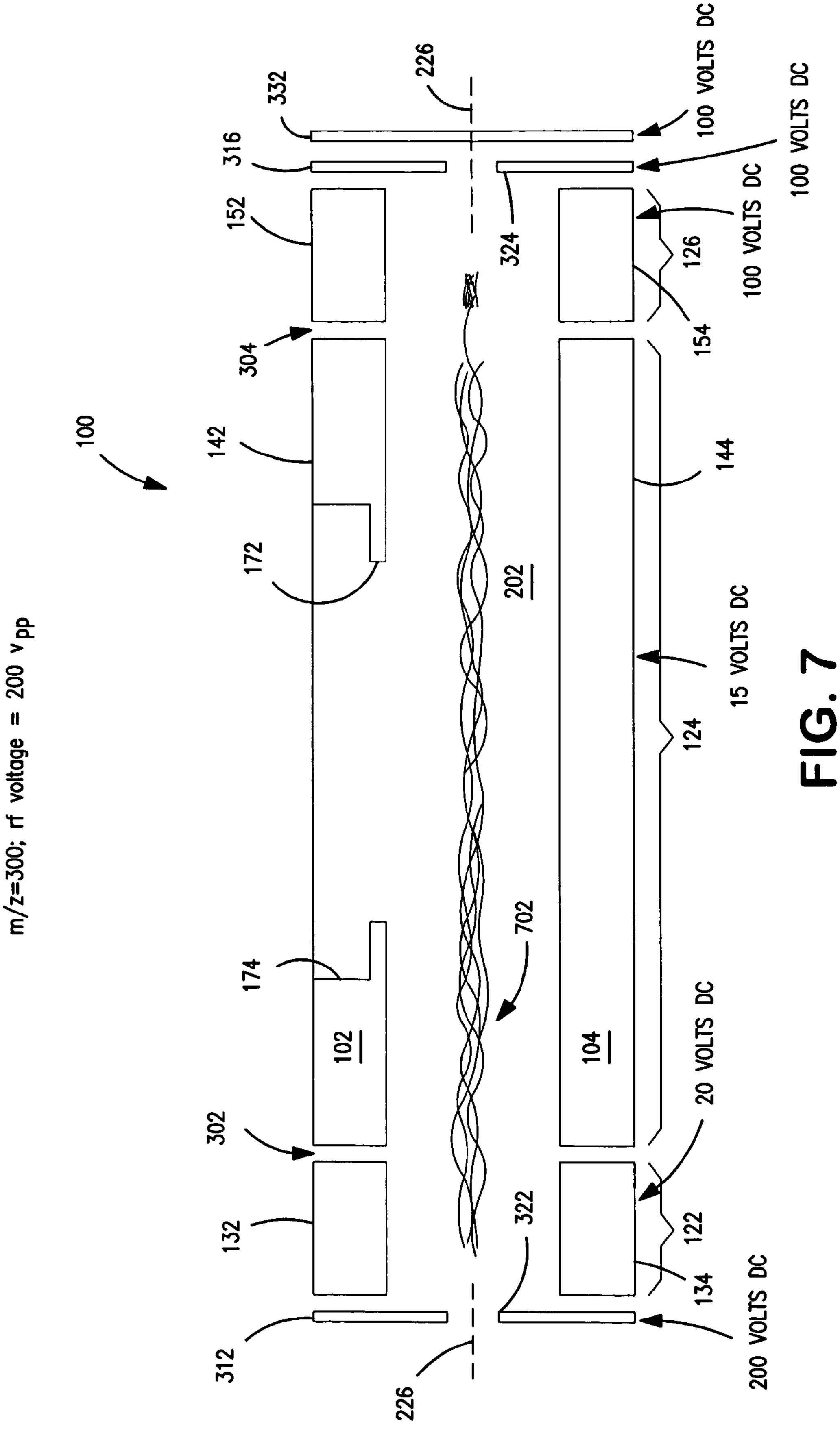
FIG. 7 is a cross-sectional view of the electrode structure illustrated in FIG. 6, illustrating the trajectory of the ion in motion along the main axis of the electrode structure after the constraining condition has been removed.

Referring to FIG. 7, after accumulation/confinement of the ions to the selected end region 122 or 126, the DC voltages applied to the various axially positioned components of the electrode structure 100 are then adjusted so as to pulse the ions—that is, quickly accelerate the ions so as to drive the ions to move in an axial direction from one end of the electrode structure 100 to or toward the other end (in the present example, from the second end region 126 to the first end region 122). Continuing with the example described in conjunction with FIG. 6, this pulsing may be accomplished by rapidly increasing the DC voltage level on the electrodes 152, 154, 156 and 158 of the second end region 126 from 10 V to 100 V and the DC voltage level on the second end plate 316 from 20 V to 100 V. All other DC voltages given above in conjunction with FIG. 6 as well as the RF voltage may be left unchanged. FIG. 7 illustrates the resulting SIMION™-calculated trajectory 702 of the single ion of m/z=300. It is observed that the high potentials at the axial ends of the electrode structure 100—in this example 200 V at the first end plate 312 and 100 V at the electrodes 152, 154, 156 and 158 of the second end region 126 and at the second end plate 316—cause the ion to reflect back and forth between the axial ends. In the presence of a damping gas, this cycling of the ion along the axial direction enables the ion to experience multiple collisions with sufficient energy to dissociate into product ions. The amplitude (or length) of the ion trajectory 702 may extend over a substantial axial length of the electrode structure 100. In some implementations, the axial amplitude extends between the first end region 122 and the second end region 126. In other implementations, the axial amplitude extends into (to a point within) at least one of the first and second end regions 122 and 126. In still other implementations, the axial amplitude extends into both of the first and second end regions 122 and 126.

Figure 8:
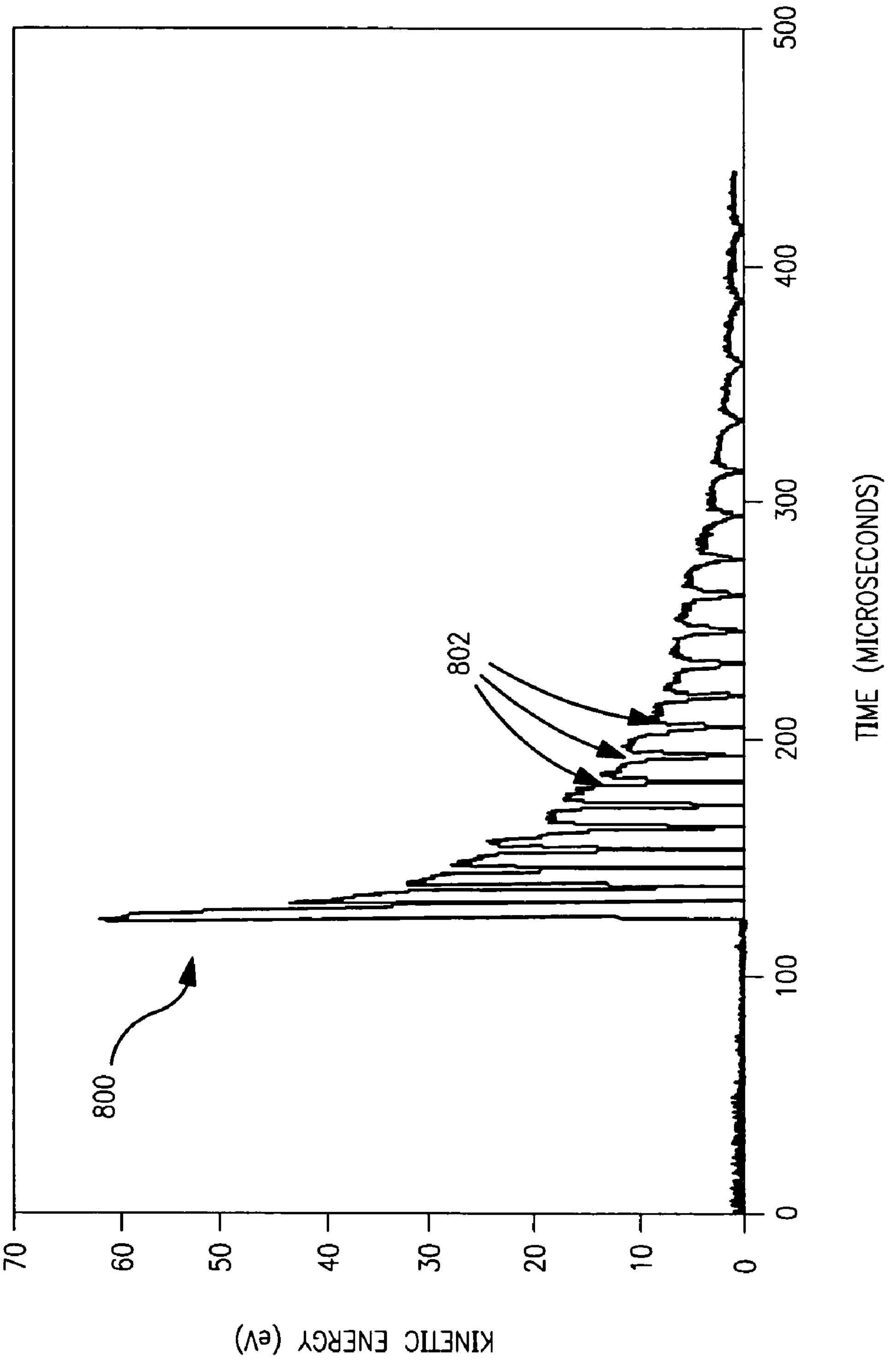
FIG. 8 is a plot of the calculated kinetic energy of the ion illustrated in FIG. 7 as a function of time.
Figure 9:
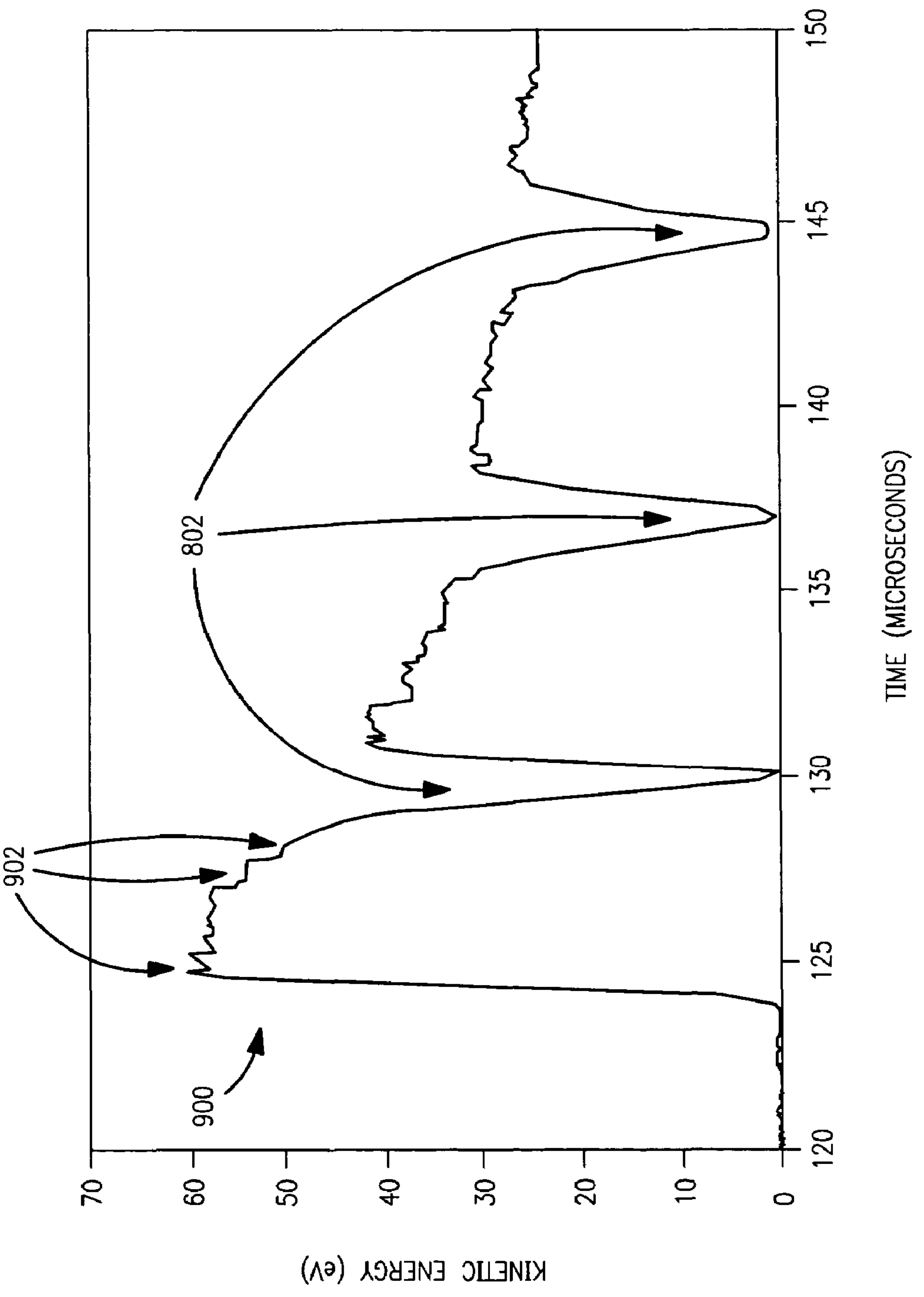
FIG. 9 is an enlarged portion of the plot illustrated in FIG. 8.

FIG. 8 illustrates a plot 800 of the calculated kinetic energy (in eV) of the ion as a function of time (in μs). It is observed that the kinetic energy of the ion is reduced almost to zero at the high-voltage axial ends of the electrode structure 100 where the ion changes direction and is reflected back toward the opposite end. Accordingly, the trajectory of the ion includes turning points, a few of which are depicted in FIG. 8 at 802, at the axial ends. The turning points 802 constitute the limits of the axial oscillation of the ion shown in FIG. 7. It is also observed that, while the ion regains some kinetic energy after turning back toward an opposing axial end, the ion continues to lose energy through collisions with the background gas. Hence, the ion loses overall kinetic energy with each half-cycle of axial motion (from one axial end to the other) and the kinetic energy progressively approaches a very low value due to the collisions. FIG. 9 illustrates an enlargement of a portion 900 of the plot 800 of FIG. 8. In addition to the turning points 802, a discrete loss of kinetic energy is observed as a result of each collision, a few of which are depicted in FIG. 9 at 902.

The process described above in conjunction with FIGS. 6-9 comprises one pulsed CID cycle, which may be sufficient for many experiments. After the ions have been accumulated and axially driven as described above, the ions, including the products of collisions, may be scanned from the electrode structure 100 by any suitable technique such as mass-selective radial ejection, and a mass spectrum may be recorded.

Alternatively, another CID cycle may be effected by isolating product ions of a desired m/z ratio in the electrode structure 100, accumulating the product ions at a selected end region 122 or 126 of the electrode structure 100 as described above, and exciting the product ions to oscillate axially through the electrode structure 100 as described above. Additional iterations of pulsed CID cycles may be effected a number of times as desired to produce successive generations of product ions.

Regarding the implementations described in the present disclosure in which CID is effected, during the first pulsed CID iteration precursor ions are accumulated and subsequently pulsed to increase their kinetic energy as described above. As the precursor ions are axially driven through the electrode structure 100, the precursor ions collide with the damping gas and lose kinetic energy as illustrated in FIGS. 8 and 9. These collisions may result in the production of fragment ions. Further dissociation of the fragment ions may be required to yield the desired product ions of lower mass. However, due to the collisions that produced the fragment ions, the kinetic energy of the fragment ions may be so low that subsequent collisions are ineffective in causing further dissociation. Likewise, some of the original precursor ions may not have dissociated at all from initial collisions and, having lost kinetic energy in the initial collisions, no longer have enough energy to be dissociated in subsequent collisions. Thus, the ions resulting from a single iteration of pulsed CID may comprise a mixture of desired product ions, intermediate product ions, and/or original precursor ions. Thus, the mass distribution of ions resulting from the first iteration of pulsed CID may be different than the mass distribution of ions before the first iteration. Moreover, after a period of time all such ions will be collisionally damped back to thermal energies. For these reasons, one or more additional pulsed CID cycles may be performed. That is, the step of accumulating the ions at one axial end of the electrode structure 100, followed by the step of accelerating the ions, may be repeated one or more times as needed to yield the desired product ions. It will be noted that the re-accumulation of ions may be effected at the same axial end as the preceding accumulation or at the opposite axial end. For example, a preceding accumulation may occur in the first end region 122 and a subsequent accumulation may occur in the second end region 126, or both of these accumulation steps may be performed in the same end region 122 or 126. Once the desired product ions have been produced, the product ions may be isolated in the electrode structure 100 and the CID process repeated one or more times for successive generations of product ions as described above, as needed to yield the final ion mass distribution desired for subsequent mass scanning.

Figure 10:
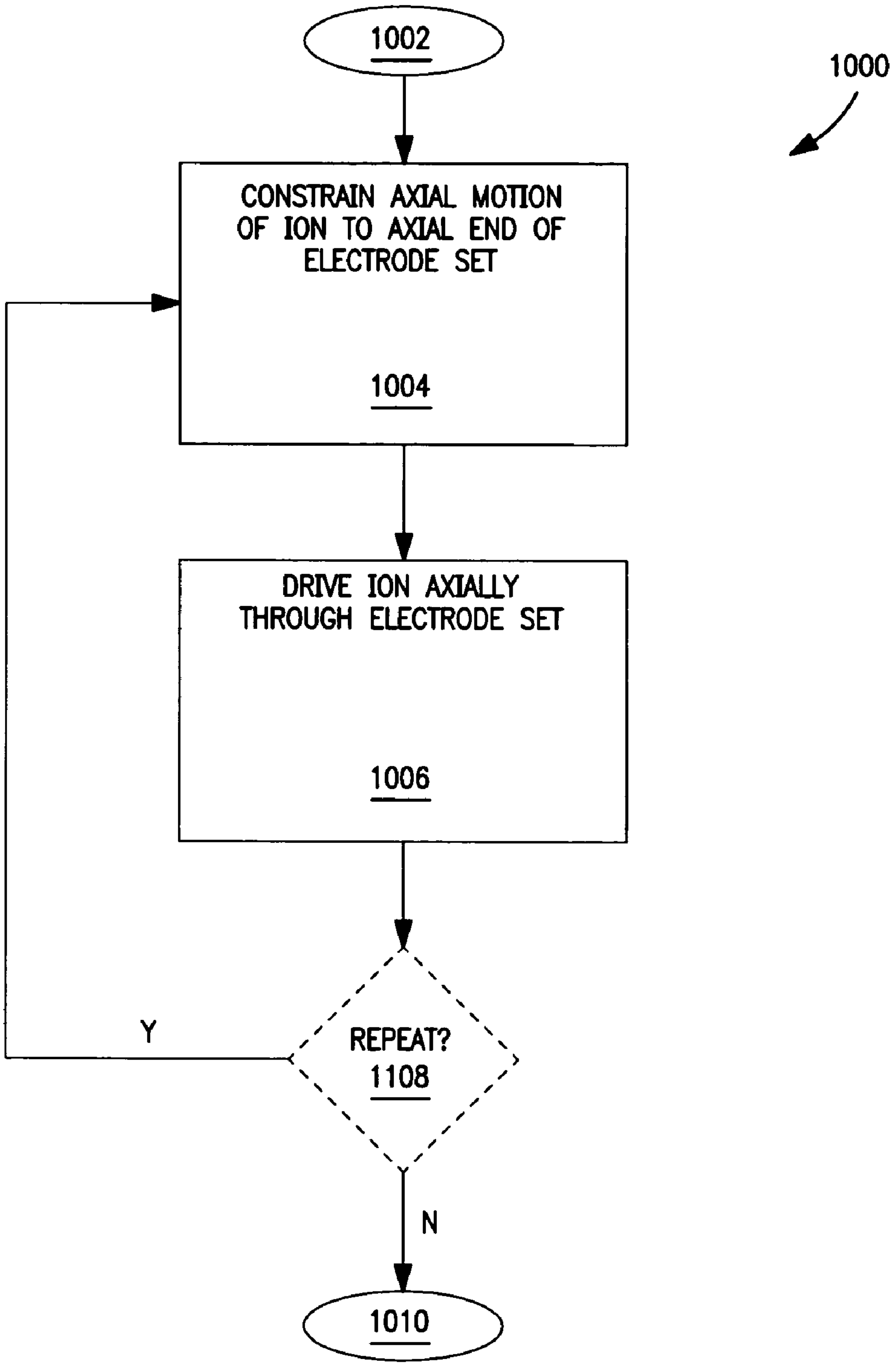
FIG. 10 is a flow diagram illustrating a method provided in accordance with one implementation described in the present disclosure.

FIG. 10 is a flow diagram 1000 illustrating an example of a method for increasing the kinetic energy of an ion in an electrode structure of linear geometry such as the electrode structure 100 illustrated in FIGS. 1-3, 6 and 7. The flow diagram 1000 may also represent an apparatus capable of performing the method. The method begins at 1002, where any suitable preliminary steps may be taken, such as providing ions in the electrode structure 100, eliminating ions of no analytical value, pre-scanning, isolating a precursor ion, introducing a gas, applying an RF trapping field, and the like. At block 1004, the axial motion of the ion is constrained substantially to a selected end region 122 or 126 of the electrode structure 100. At block 1006, the ion is driven to move axially from the selected end region 122 or 126 toward the other end region 126 or 122 and to reflect back toward the selected end region 122 or 126. The process ends at 1010, where any suitable succeeding steps may be taken, such as mass-scanning, generating a mass spectrum, and the like. Optionally, as indicated at 1008, a determination may be made as to whether to repeat steps 1004 and 1006. Depending on the outcome of this determination, the process either returns to block 1004 or ends at 1010.

Figure 11:
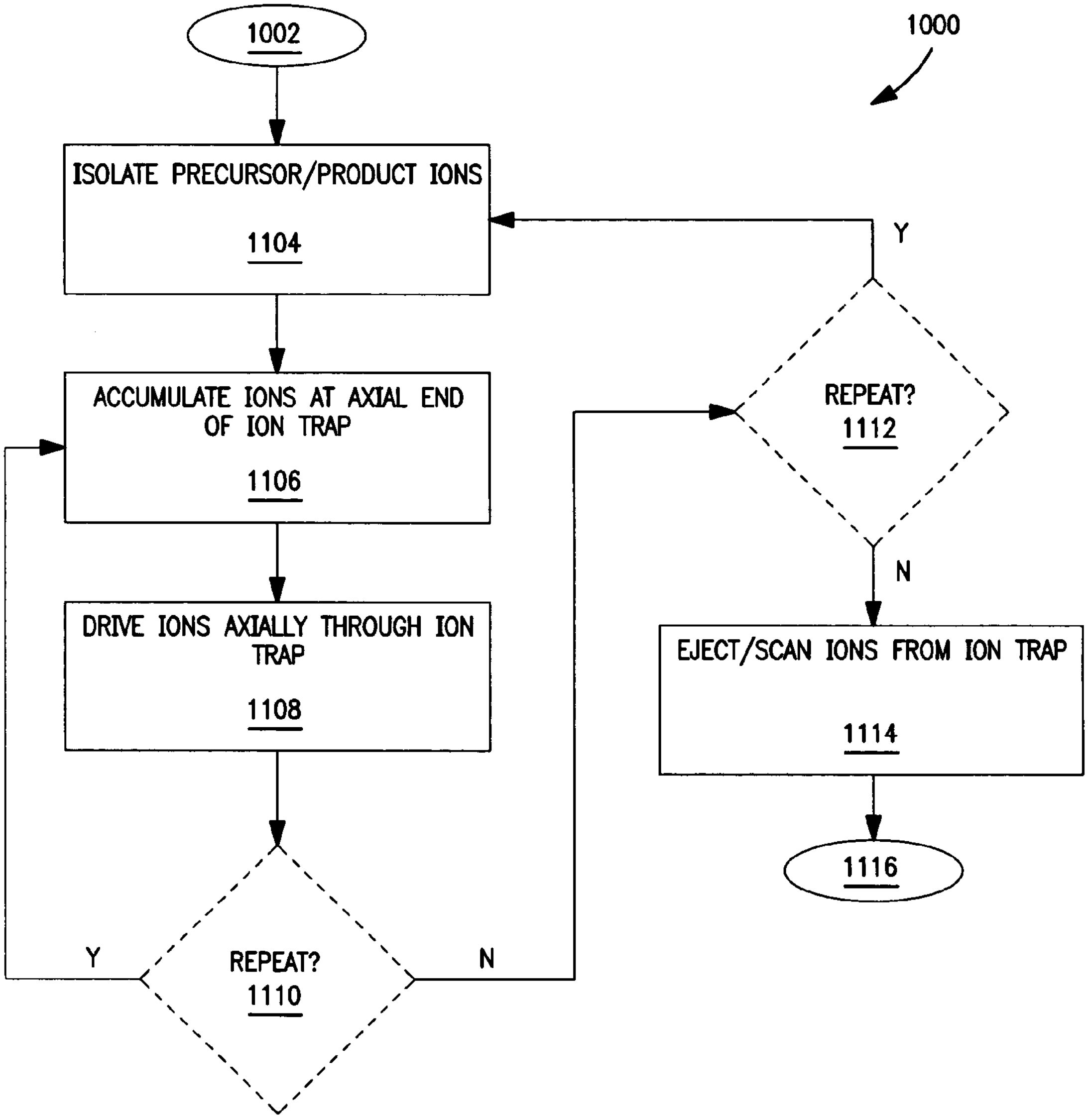
FIG. 11 is a flow diagram illustrating a method provided in accordance with another implementation described in the present disclosure.

FIG. 11 is a flow diagram 1100 illustrating an example of a method for dissociating a precursor ion in a linear ion trap. The electrode structure 100 illustrated in FIGS. 1-3, 6 and 7 may operate as or be a part of such a linear ion trap. The flow diagram 1100 may also represent a linear electrode structure or linear ion trap apparatus capable of performing the method. The method begins at 1102, where any suitable preliminary steps may be taken, such as providing ions in the electrode structure 100, eliminating ions of no analytical value, pre-scanning, introducing a gas, applying an RF trapping field, and the like. At block 1104, one or more precursor ions are isolated. At block 1106, the precursor ions are accumulated at a selected end region 122 or 126 of the electrode structure 100. At block 1108, the precursor ions are driven to move axially from the selected end region 122 or 126 toward the other end region 126 or 122 and to reflect back toward the selected end region 122 or 126. This step may cause one or more collisions between precursor ions and a gas present in the interior space 202 of the electrode structure 100. The collisions may produce product ions. Next, at block 1114, the ions may be ejected from the electrode structure 100. The ejection may be carried out on a mass-dependent basis to provide data for generating a mass spectrum. The process ends at 1116, where any suitable succeeding steps may be taken, such as generating a mass spectrum and the like. Optionally, as indicated at 1110, after the driving step 1108 a determination may be made as to whether to repeat steps 1106 and 1108. Depending on the outcome of this determination, the process either returns to block 1106 or proceeds to block 1114. As a further option, after performing steps 1106 and 1108 one or more times, a determination may be made as to whether to repeat the isolation step 1104 to isolate a product ion in preparation for another iteration of CID. Depending on the outcome of this determination, the process either returns to block 1104 or proceeds to block 1114.

Figure 12:
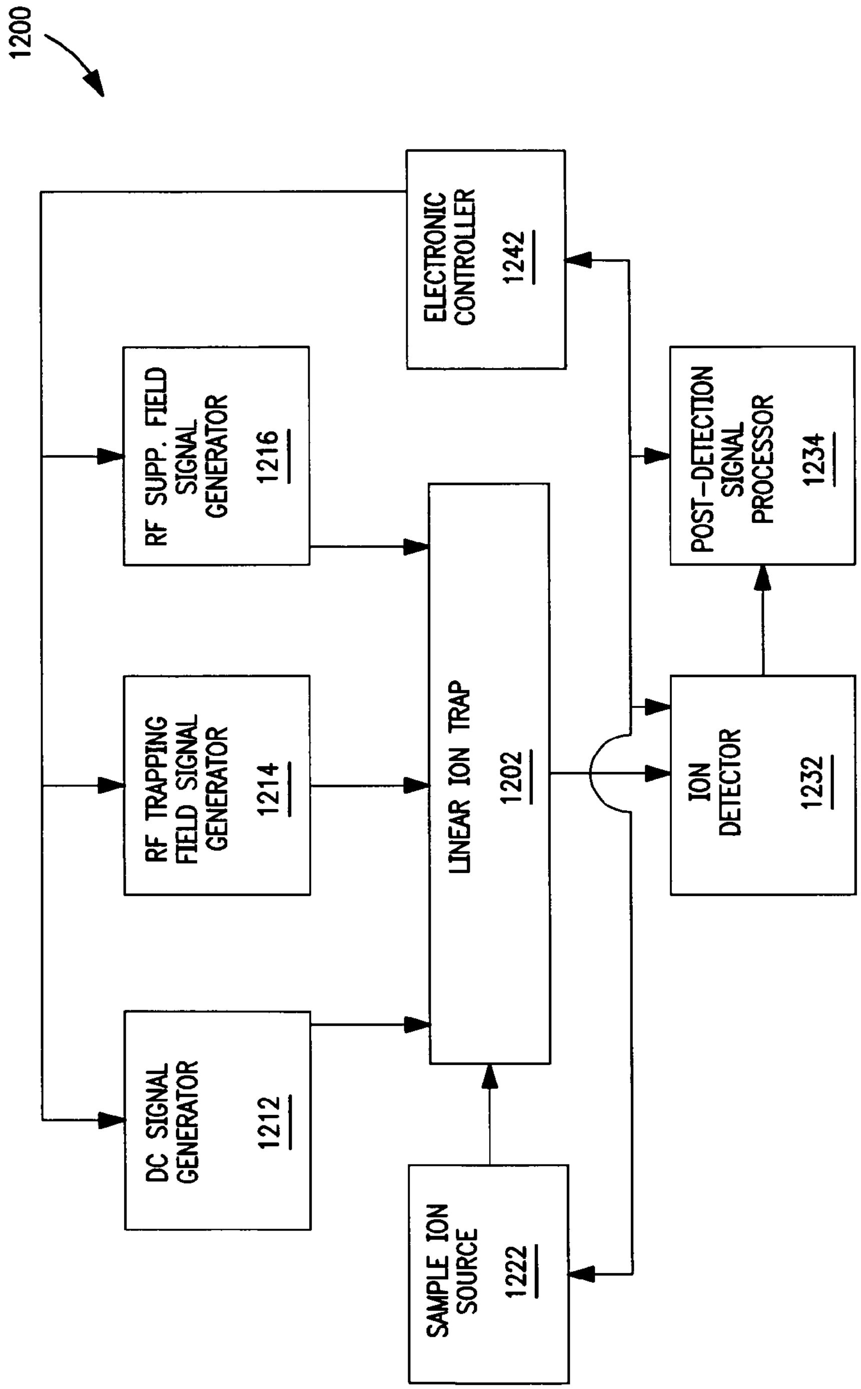
FIG. 12 is a schematic diagram of a mass spectrometry system.

FIG. 12 is a highly generalized and simplified schematic diagram of an example of a linear ion trap-based mass spectrometry (MS) system 1200. The MS system 1200 illustrated in FIG. 12 is but one example of an environment in which implementations described in the present disclosure are applicable. Apart from their utilization in implementations described in the present disclosure, the various components or functions depicted in FIG. 12 are generally known and thus require only brief summarization.

The MS system 1200 includes a linear or two-dimensional ion trap 1202 that may include an electrode structure such as the electrode structure 100 described above and illustrated in FIGS. 1-3, 6 and 7. A variety of DC and AC (RF) voltage sources may operatively communicate with the various conductive components of the ion trap 1202 as described above. These voltage sources may include as a DC signal generator 1212, an RF trapping field signal generator 1214, and an RF supplemental field signal generator 1216. A sample or ion source 1222 may be interfaced with the ion trap 1202 for introducing sample material to be ionized in the case of internal ionization or ions in the case of external ionization. One or more gas sources 242 (FIG. 2) may communicate with the ion trap 1202 as previously noted. The ion trap 1202 may communicate with one or more ion detectors 1232 for detecting ejected ions for mass analysis. The ion detector 1232 may communicate with a post-detection signal processor 1234 for receiving output signals from the ion detector 1232. The post-detection signal processor 1234 may represent a variety of circuitry and components for carrying out signal-processing functions such as amplification, summation, storage, and the like as needed for acquiring output data and generating mass spectra. As illustrated by signal lines in FIG. 12, the various components and functional entities of the MS system 1200 may communicate with and be controlled by any suitable electronic controller 1242. The electronic controller 1242 may represent one or more computing or electronic-processing devices, and may include both hardware and software attributes. As examples, the electronic controller 1242 may control the operating parameters and timing of the voltages supplied to the ion trap 1202 by the DC signal generator 1212, the RF trapping field signal generator 1214, and the RF supplemental field signal generator 1216. In addition, the electronic controller 1242 may execute or control, in whole or in part, one or more steps of the methods described in the present disclosure.

It can be appreciated from the foregoing that one or more implementations of the invention as described by way of example above may provide advantages over prior art techniques that increase the kinetic energy of ions in linear electrode structures such as those employed as ion traps—for example, prior art techniques that rely on resonant RF excitation fields and/or acceleration of ions in directions orthogonal to the central axis of the linear electrode structure. One advantage is allowing higher kinetic-energy collisions between ions and gas without limiting the mass range, by increasing the energy of the ions in the axial direction rather than the radial (transverse) direction. Another advantage is allowing multiple cycles of trapping, pulsing and dissociating the ions to increase the efficiency of the conversion of precursor ions to product ions by repeating these cycles multiple times.

It will be understood that the methods and apparatus described in the present disclosure may be implemented in an MS system as generally described above and illustrated in FIG. 12 by way of example. The present subject matter, however, is not limited to the specific MS apparatus 1200 illustrated in FIG. 12 or to the specific arrangement of circuitry illustrated in FIG. 12. Moreover, the present subject matter is not limited to MS-based applications.

It will be further understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for increasing the kinetic energy of an ion in a direction along a central axis of a linear electrode structure, the electrode structure including a first end region, a second end region spaced from the first end region along the central axis, and a central region axially interposed between the first and second end regions, and defining an interior space in which the ion is disposed, the interior space extending along the central axis through the first end region, the central region and the second end region, the method conspiring the steps of:

constraining axial motion of the ion substantially to a selected one of the first and second end regions; and driving the ion to move axially from the selected end region toward the other end region and to reflect back toward the selected end region, by subjecting the ion to an electric field that maximizes the amount of kinetic energy imparted to the ion while driven from the selected end region toward the other end region.

2. The method of claim 1 comprising, prior to constraining, admitting the ion into the interior space via the first end region.

3. The method of claim 1 comprising, prior to constraining, admitting the ion into the interior space via the second end region.

4. The method of claim 1, comprising repeating the steps of constraining and driving one or more times such that the kinetic energy of the ion is increased more than once wherein, for each step of constraining, the end region selected for constraining is either the first end region or the second end region.

5. The method of claim 1, wherein constraining includes applying a plurality of DC voltages respectively to the first end region, the central region, and the second end region at respective magnitudes to create an axial potential well at the selected end region, and driving includes adjusting the DC voltage applied to the selected end region.

6. The method of claim 5, wherein the electrode structure includes an electrically conductive member spaced from the selected end region along the central axis and the selected end region is axially interposed between the central region and the conductive member, and wherein constraining further comprises applying an additional DC voltage to the conductive member and driving further comprises adjusting tile additional DC voltage.

7. The method of claim 5 comprising:

after driving, constraining axial motion of the ion substantially to a selected one of the first and second end regions by adjusting one or more of the plurality of DC voltages applied to the first end region, the central region, and the second end region to create an axial potential well in the selected end region; and driving the ion to move axially from the selected end region toward the other end region and to reflect back toward the selected end region by adjusting the DC voltage applied to the selected end region to a magnitude having an absolute value greater than the value applied during the constraining step.

8. The method of claim 7, comprising repeating the steps of constraining and driving one or more times wherein, for each step of constraining the end region selected for constraining is either the first end region or the second end region.

9. The method of claim 1, Wherein the ion is a desired ion, and the method further comprises, prior to constraining, isolating the desired ion in the interior space by ejecting from the interior space one or more other ions having one or more respective m/z ratios different from the m/z ratio of the desired ion.

10. The method of claim 1, comprising dissociating the ion to produce one or more product ions by providing a gas in the interior space while driving.

11. The method of claim 10, comprising ejecting at least one of the product ions from the interior space along a direction orthogonal to the central axis.

12. The method of claim 10, wherein at least one of the product ions is a desired ion, and the method further comprises isolating the desired ion in the interior space by ejecting from the interior space other ions having or more respective m/z different from the m/z ratio of the desired ion.

13. The method of claim 12, wherein the desired ion is a first generation product ion, and The method further comprises repeating one or more times the steps of constraining, driving, dissociating and isolating on one or more successive generations of product ions to yield an nth generation product ion.

14. The method of claim 12, wherein constraining includes applying a plurality of DC voltages respectively to the first end region, the central region, and the second end region at respective magnitudes to create an axial potential well at the selected end region, and driving includes adjusting the DC voltage applied to the selected end region, and the method further comprises:

after isolating, constraining axial motion of the desired ion substantially to a selected one of the first and second end regions by adjusting one or more of the plurality of DC voltages applied to the first end region, the central region, and the second end region to create an axial potential well in the selected end region; and driving the desired ion to move axially from the selected end region toward the other end region and to reflect back toward the selected end region by adjusting the DC voltage applied to the selected end region to a magnitude having an absolute value greater than the value applied during the constraining step.

15. The method of claim 14, comprising repeating the steps of constraining and driving one or more times herein, for each step of constraining the end region selected for constraining is either the first end region or the second end region.

16. A method for dissociating a precursor ion in a linear ion trap, the linear ion trap including a first end region, a second end region spaced from the first end region along an elongated axis of the liner ion trap, a central region interposed between the first and second end regions, and a plurality of electrodes in each of the regions arranged coaxially about the elongated axis and defining an elongated volume of the linear ion trap, the method comprising the steps of:

accumulating a plurality of ions in the interior space substantially at a selected one of the first and second end regions, the plurality of ions including one or more precursor ions; and driving the plurality of ions to move axially from the selected end region toward the other end region and to reflect back toward the selected end region to dissociate at least one precursor ion via axial acceleration of the at least one precursor ion by causing a collision between the at least one precursor ion and a gas in the interior space.

17. The method of claim 16, wherein accumulating comprises applying a plurality of DC voltages respectively to the first end region, the central region, and the second end region at respective magnitudes to create an axial potential well at the selected end region, and driving comprises adjusting the DC voltage applied to the selected end region.

18. The method of claim 16 comprising, after accumulating and driving, repeating the steps of accumulating and driving one or more times wherein, for each accumulation, the end region selected for accumulation is either the first end region or the second end region.

19. The method of claim 16, wherein driving produces one or more product ions, and the method further comprises:

accumulating the one or more product ions substantially at a selected one of the first and second end regions, wherein the end region selected for accumulating the one or more product ions is either the first end region or the second end region; and driving the one or more product ions to move axially from the selected end region toward the other end region and to reflect back toward the selected end region to cause a collision between at least one of the product ions and the gas.

20. The method of claim 19 comprising repeating the steps of accumulating and driving one or more times on one or more successive generations of productions to yield an nth generation product ion wherein, for each accumulation, the end region selected for accumulation is either the first end region or the second end region.

21. An apparatus for increasing the kinetic energy of an ion along an axial direction, the apparatus comprising:

a linear electrode structure including a first end region, a second end region spaced from the first end region along a central axis, and a central region axially interposed between the first and second end regions, and defining an interior space extending along the central axis through the first end region, the central region and the second end region, means for constraining axial motion of one or more ions in the interior space substantially to a selected one of the first and second end regions; and means for driving the one or more ions to move axially from the selected end region toward the other end region and to reflect back toward the selected end region, by subjecting the ion to an electric field that maximizes the amount of kinetic energy imparted to the ion while driven from the selected end region toward the other end region.

22. The apparatus of claim 21, wherein the means for constraining includes means for applying a plurality of DC voltages respectively to the first end region, the central region, and the second end region at respective magnitudes to create an axial potential well at the selected end region and the means for driving includes means for adjusting the DC voltage applied to the selected end region.

* * * * *